(12) United States Patent
Paunovic et al.

(10) Patent No.: US 12,649,403 B2
(45) Date of Patent: Jun. 9, 2026

(54) BEVERAGE CONTAINER HOLDER FOR VEHICLES

(71) Applicants: Maxine Paunovic, Grass Valley, CA (US); Dean Paunovic, Grass Valley, CA (US); Kurt Sandiforth, Grass Valley, CA (US)

(72) Inventors: Maxine Paunovic, Grass Valley, CA (US); Dean Paunovic, Grass Valley, CA (US); Kurt Sandiforth, Grass Valley, CA (US)

( * ) Notice: Subject to any disclaimer, the term of this patent is extended or adjusted under 35 U.S.C. 154(b) by 155 days.

(21) Appl. No.: 18/084,699

(22) Filed: Dec. 20, 2022

(65) Prior Publication Data

US 2023/0191977 A1     Jun. 22, 2023

Related U.S. Application Data

(60) Provisional application No. 63/292,202, filed on Dec. 21, 2021.

(51) Int. Cl.
B60N 3/10          (2006.01)
(52) U.S. Cl.
CPC ................................... B60N 3/103 (2013.01)
(58) Field of Classification Search
CPC ...................................................... B60N 3/103
USPC .......................................................... 224/275
See application file for complete search history.

(56) References Cited

U.S. PATENT DOCUMENTS

| | | | | |
|---|---|---|---|---|
| 2,289,701 A | * | 7/1942 | Engel | B60N 3/103 |
| | | | | 248/311.2 |
| 2,645,392 A | * | 7/1953 | Gottsegen | A45C 11/20 |
| | | | | 206/541 |
| 2,877,833 A | * | 3/1959 | Boles | B60R 22/105 |
| | | | | 297/484 |
| 3,388,886 A | * | 6/1968 | Tucker | B60R 7/043 |
| | | | | 297/485 |
| 4,120,426 A | * | 10/1978 | Grubbs | B60R 7/043 |
| | | | | 222/181.3 |
| 4,466,659 A | | 8/1984 | Carpentier | |
| 4,718,623 A | | 1/1988 | Mcclure | |
| 4,757,928 A | | 7/1988 | Browne | |
| 4,762,087 A | * | 8/1988 | Henecke | A01K 5/0114 |
| | | | | 119/61.56 |
| 4,844,400 A | | 7/1989 | Jasmagy, Jr. | |
| 4,858,995 A | * | 8/1989 | Young | B60N 2/787 |
| | | | | 297/227 |
| 4,938,439 A | * | 7/1990 | Fried | B60N 2/787 |
| | | | | 248/444 |
| 4,951,910 A | | 8/1990 | March | |
| 4,955,572 A | | 9/1990 | Simmons | |
| 4,957,254 A | | 9/1990 | Hill | |
| 5,105,768 A | * | 4/1992 | Johnson | A01K 7/005 |
| | | | | 119/72 |
| 5,249,770 A | | 10/1993 | Louthan | |
| 5,301,857 A | | 4/1994 | Green | |
| 5,456,436 A | | 10/1995 | Faudie | |

(Continued)

*Primary Examiner* — Peter N Helvey
(74) *Attorney, Agent, or Firm* — Heisler & Associates

(57)          ABSTRACT

A beverage container holder for vehicles is disclosed. An example embodiment includes: a container holder; and one or more anchors removably attached to the container holder. The beverage container holder for vehicles can include one or more anchors having a compressible material portion. The beverage container holder for vehicles can be further configured with a removably attachable strap.

17 Claims, 11 Drawing Sheets

(56)                  References Cited

U.S. PATENT DOCUMENTS

| | | | | |
|---|---|---|---|---|
| 5,678,741 | A * | 10/1997 | Schieber | B60N 3/004 |
| | | | | D12/416 |
| 5,722,574 | A * | 3/1998 | Pratt | A45F 5/00 |
| | | | | 224/660 |
| 5,911,472 | A * | 6/1999 | Toth | A47C 7/546 |
| | | | | 297/188.2 |
| 6,264,153 | B1 * | 7/2001 | Ragner | B62B 9/26 |
| | | | | 224/482 |
| 6,264,154 | B1 | 7/2001 | Hiscox | |
| 6,286,798 | B1 | 9/2001 | Chun | |
| 6,325,350 | B1 * | 12/2001 | Mancuso | A63B 55/408 |
| | | | | 248/230.1 |
| 6,401,993 | B1 * | 6/2002 | Andrino | A45F 5/00 |
| | | | | D3/229 |
| 6,513,686 | B1 * | 2/2003 | Ben-Sasson | B60N 2/809 |
| | | | | 215/388 |
| 7,533,860 | B2 * | 5/2009 | Somuah | B60N 3/102 |
| | | | | 206/217 |
| 7,717,518 | B2 * | 5/2010 | Elung | B60N 2/787 |
| | | | | 280/751 |
| 7,784,864 | B2 | 8/2010 | Feder | |
| 8,267,291 | B2 | 9/2012 | Simon | |
| 8,500,076 | B2 * | 8/2013 | Lai | B62B 9/26 |
| | | | | 248/102 |
| 8,740,167 | B1 * | 6/2014 | Collins | A01D 75/00 |
| | | | | 211/74 |
| 9,027,807 | B2 | 5/2015 | Kampas | |
| 9,167,904 | B2 * | 10/2015 | McDonnell | A47C 7/68 |
| 9,392,862 | B1 | 7/2016 | Hajianpour | |
| 9,428,313 | B2 | 8/2016 | Olsen | |
| 9,615,540 | B1 * | 4/2017 | Mansour | A01K 7/00 |
| 9,616,793 | B2 | 4/2017 | Lliorca | |
| 9,623,806 | B2 | 4/2017 | Rodriguez | |
| 9,975,492 | B2 | 5/2018 | Cardonna | |
| 10,071,025 | B2 * | 9/2018 | Wilson | A61J 9/0661 |
| 10,227,029 | B2 | 3/2019 | Maeda | |
| 10,399,473 | B1 * | 9/2019 | Moseley | B60N 2/787 |
| 10,450,125 | B2 * | 10/2019 | Haden | B65D 83/771 |
| 11,051,491 | B1 * | 7/2021 | Butler | A01K 7/00 |
| 11,730,138 | B2 * | 8/2023 | Namerow | A01K 7/005 |
| | | | | 119/61.54 |
| 2002/0148868 | A1 | 10/2002 | Dion-Bildstein | |
| 2003/0047578 | A1 | 3/2003 | Barnett | |
| 2006/0283899 | A1 * | 12/2006 | Hill | B60R 7/043 |
| | | | | 224/400 |
| 2009/0039128 | A1 * | 2/2009 | Damico | B60R 7/043 |
| | | | | 224/572 |
| 2009/0206098 | A1 | 8/2009 | Garahan | |
| 2015/0069096 | A1 * | 3/2015 | Kampas | A45F 5/00 |
| | | | | 224/148.6 |
| 2017/0182937 | A1 | 6/2017 | Takahama | |
| 2017/0245644 | A1 * | 8/2017 | Lobel | A47C 7/021 |
| 2019/0343313 | A1 | 11/2019 | Sanborn | |

* cited by examiner

112

132

Anchor Attachment Loop Strips

112

112

112

110

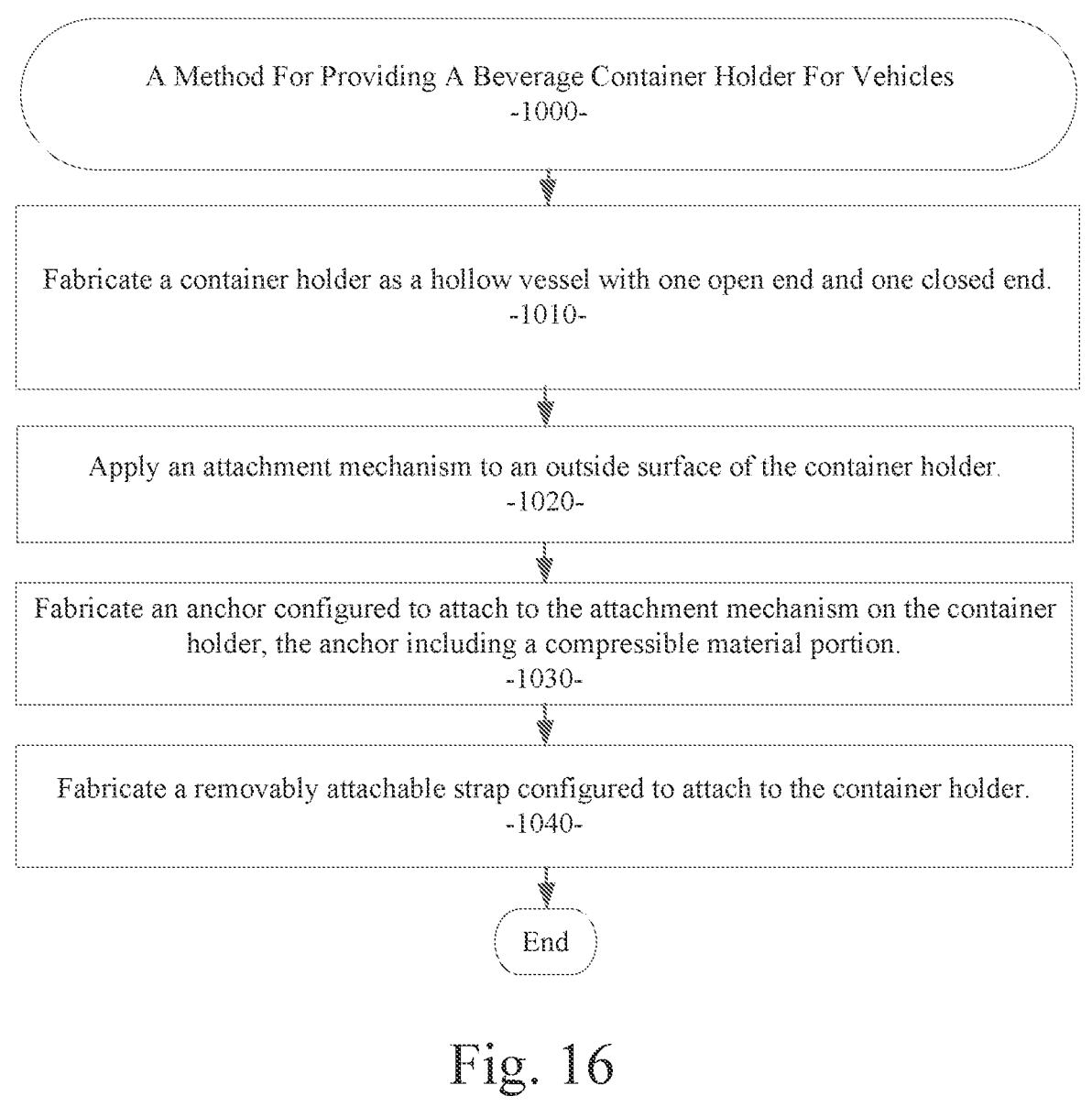

A Method For Providing A Beverage Container Holder For Vehicles
-1000-

Fabricate a container holder as a hollow vessel with one open end and one closed end.
-1010-

Apply an attachment mechanism to an outside surface of the container holder.
-1020-

Fabricate an anchor configured to attach to the attachment mechanism on the container holder, the anchor including a compressible material portion.
-1030-

Fabricate a removably attachable strap configured to attach to the container holder.
-1040-

End

Fig. 16

BEVERAGE CONTAINER HOLDER FOR VEHICLES

PRIORITY PATENT APPLICATION

This non-provisional patent application draws priority from U.S. provisional patent application Ser. No. 63/292,202; filed Dec. 21, 2021. This present non-provisional patent application draws priority from the referenced patent application. The entire disclosure of the referenced patent application is considered part of the disclosure of the present application and is hereby incorporated by reference herein in its entirety.

COPYRIGHT

TECHNICAL FIELD

The disclosed subject matter relates to beverage containers and holders for beverage containers, and particularly although not exclusively, to a beverage container holder for vehicles.

BACKGROUND

Beverage containers, such as plastic water bottles, Hydro-Flask™ containers, etc., have become ubiquitous. The utility and convenience of these beverage containers for hydration throughout the day has made them very popular. In particular, these beverage containers are often transported or used in vehicles for hydration while driving or for use at a destination. However, most vehicles are not configured to retain larger beverage containers in cup holders or other receptacles in the vehicle. As a result, larger beverage containers can roll around or fly off seats while a vehicle is in motion. User inconvenience and safety issues can result from unrestrained beverage containers in a moving vehicle.

SUMMARY

According to various example embodiments of the disclosed subject matter as described herein, there is disclosed, illustrated, and claimed a beverage container holder for vehicles. Example embodiments of the disclosed beverage container holder include one or more container holders, a removably attachable and adjustable strap, and an anchor attachment loop strip attached to a side of the container holder. The example embodiments of the disclosed beverage container holder also include one or more removably attachable anchors in various sizes and shapes. The anchors provide a securing mechanism to confine the container holder, and the beverage container therein, to a particular desired position within a vehicle. The anchor serves as a wedge that can be inserted between the seat, floorboard, and/or the vehicle console to secure the beverage containers so they do not topple over. The anchor works both in the front seat and the back seats of the vehicle. In an example embodiment, the anchors can be made with foam or other compressible material so the anchor is soft enough to wedge in and then expand between the seats. The anchor foam can be covered with a cloth covering. Example embodiments of the disclosed beverage container holder can include a plurality of container holders, which can be attached together with straps, snaps, or Velcro™, to keep the plurality of container holders from swinging forward. The example embodiments can include a seat version, for which a smaller anchor can be wedged between the top and the bottom of the seat. The example embodiment can include a strap that goes around the headrest or under a console top cover.

Example embodiments of the disclosed beverage container holder can be fabricated from fabric, with the top opening having a rigid plastic, wire, or stiff leather perimeter, so that the opening doesn't crush under the weight of the beverage container inserted therein. However, in various embodiments, the beverage container holder can be fabricated from a variety of materials including nylon, cotton, canvas, synthetic materials, plastic, fiberglass, bamboo, wood, metal, or other material suitable for retaining a beverage container. Example embodiments are described in more detail below.

BRIEF DESCRIPTION OF THE DRAWINGS

Embodiments are illustrated by way of example and not limitation in the figures of the accompanying drawings, in which:

FIG. 16 illustrates a flow diagram representing a sequence of operations performed in a method according to an example embodiment.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is disclosed, illustrated, and claimed a beverage container holder for vehicles. The example embodiments disclosed herein provide an apparatus, system, and method implemented as a beverage container holder for vehicles.

Figure 1:
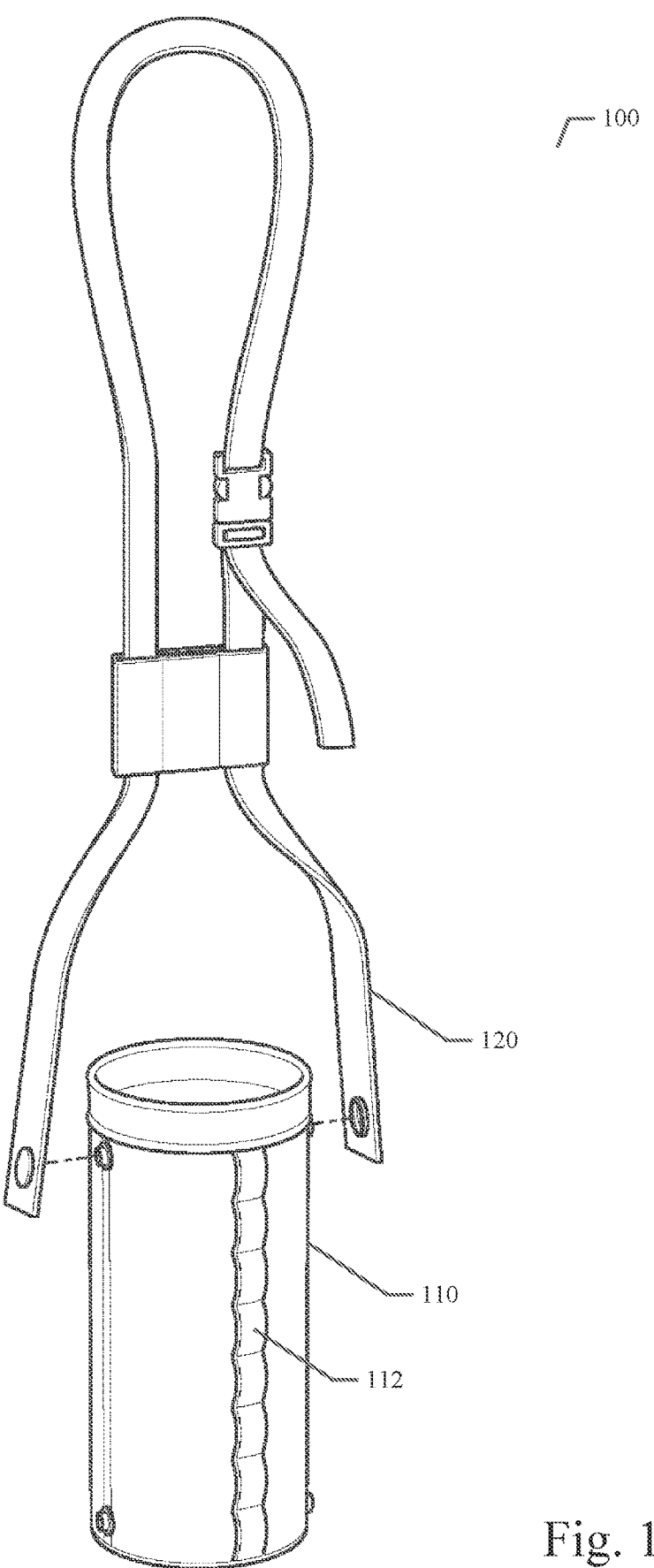
FIG. 1 illustrates an example embodiment of the beverage container holder for vehicles.

FIG. 1 illustrates an example embodiment of the beverage container holder for vehicles 100. Referring now to FIG. 1 in an example embodiment, the beverage container holder 100 includes a container holder 110, a removably attachable and adjustable strap 120, and an anchor attachment loop strip 112 attached to an outer side of the container holder 110. The container holder 110 is configured as a hollow vessel or cylinder with one open end and one closed end. The vessel or cylinder is configured to provide a receptacle for holding beverage containers, such as plastic water bottles, HydroFlask™ containers, etc. The container holder 110 can be fabricated from a variety of materials including nylon, cotton, canvas, synthetic materials, plastic, fiberglass, bamboo, wood, metal, wire mesh, or other material suitable for retaining a beverage container. The container holder 110 can include one or more attachment snaps or other attachment mechanisms on an outer surface to which strap 120 can be attached. The container holder 110 can further include one or more anchor attachment loop strips 112 attached to an outer surface of the container holder 110. As described in more detail below, the anchor attachment loop strips 112 can be used to removably attach one or more anchors 130 to the container holder 110. FIG. 1 also shows a removably attachable and adjustable strap 120 that can be removably attached to the container holder 110 with one or more attachment snaps or other attachment mechanisms. The length of the strap 120 can be adjusted using a provided strap adjustment clip.

Figure 2:
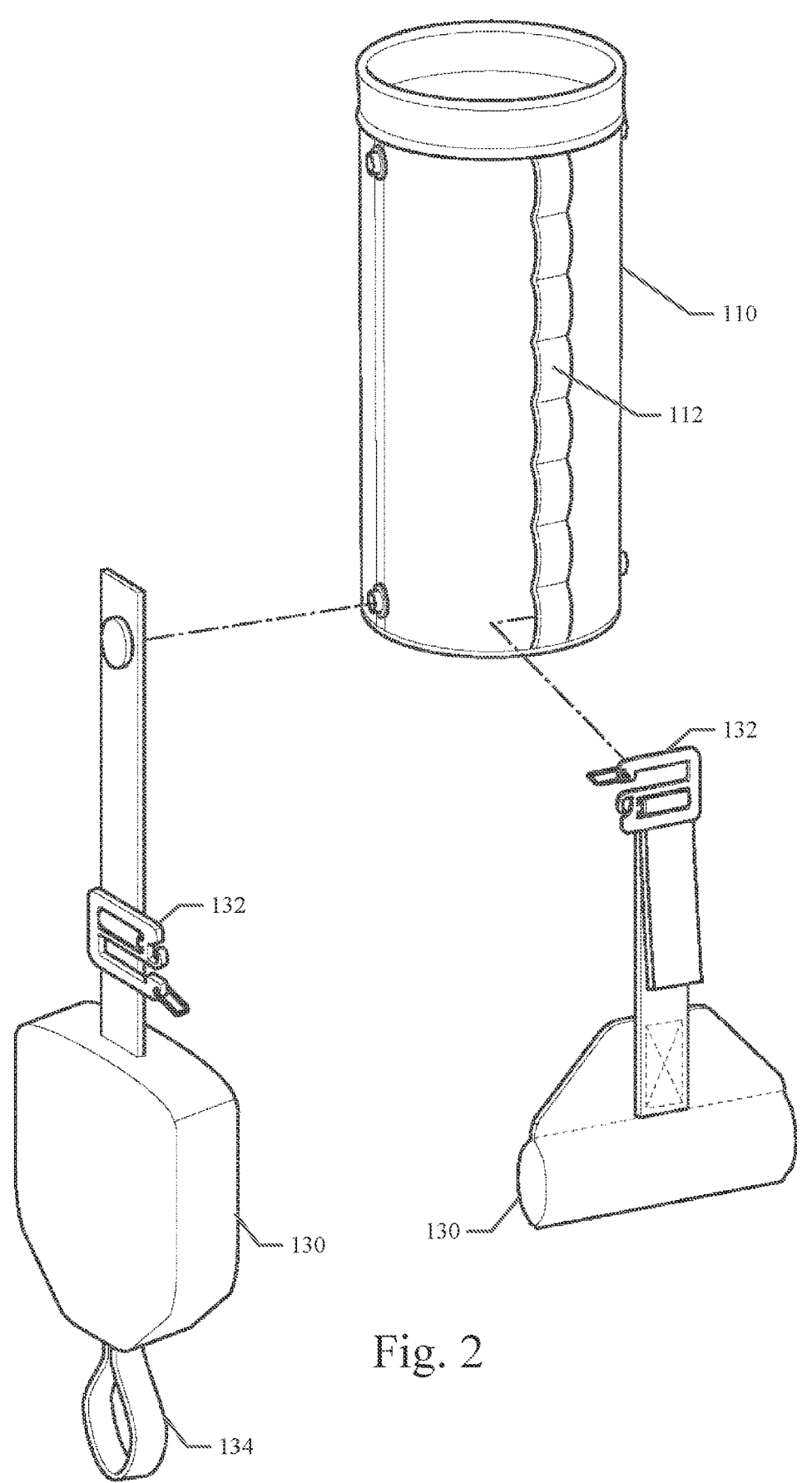
FIG. 2 illustrates example embodiments of the beverage container holder for vehicles with removably attachable anchors in various sizes and shapes.

FIG. 2 illustrates example embodiments of the beverage container holder for vehicles 100 with one or more removably attachable anchors 130 in various sizes and shapes. The anchors 130 provide a securing mechanism to confine the container holder 110, and the beverage container therein, to a particular desired position within the vehicle. The anchor 130 serves as a wedge that can be inserted between the vehicle seat, the floorboard, and/or the vehicle center console to secure the beverage containers so they do not topple over. The anchor 130 works both in the front seats and the back seats of the vehicle.

Figures 3, 4:
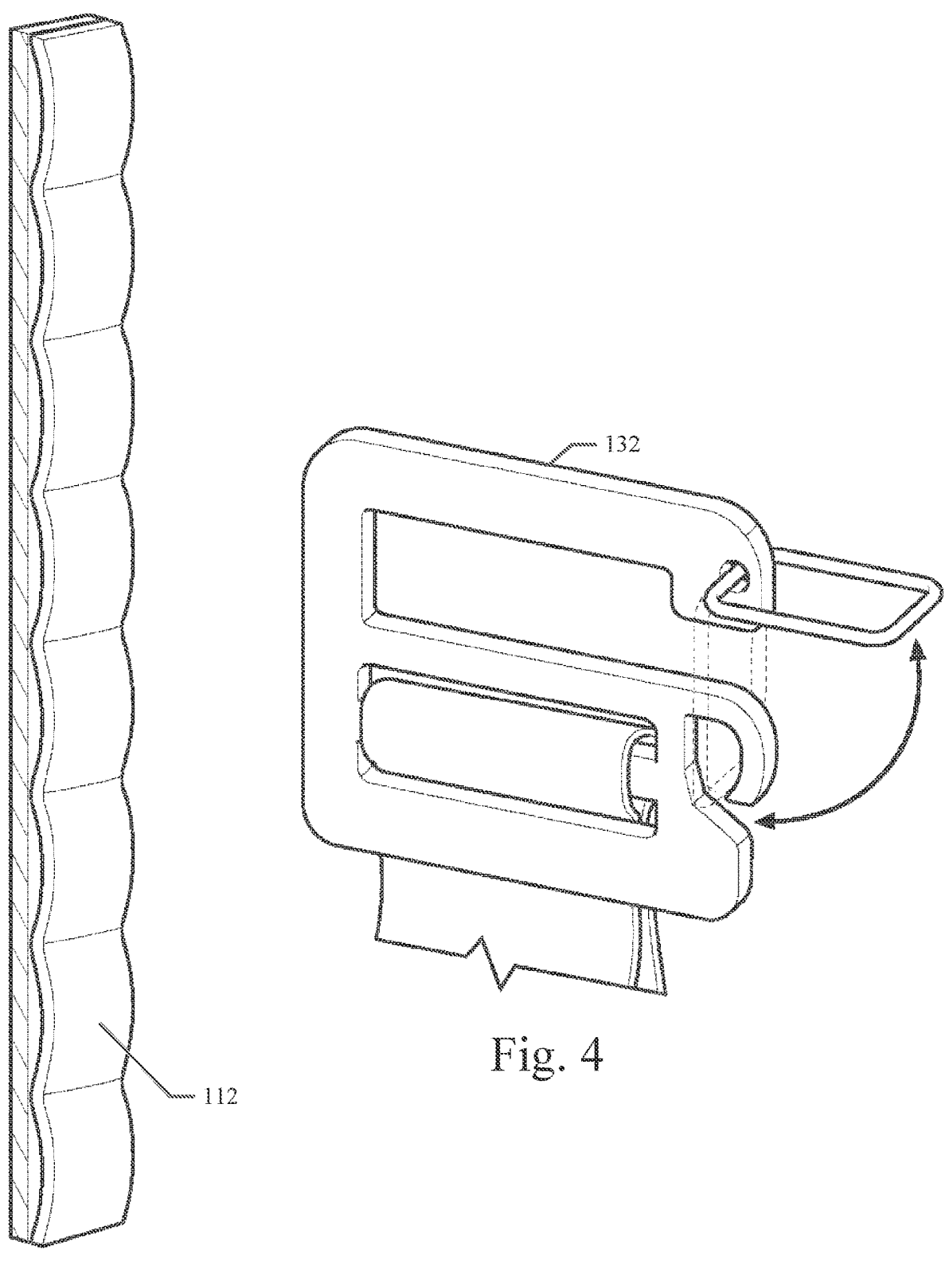
FIG. 3 illustrates a detail of an example embodiment of the beverage container holder for vehicles showing the anchor attachment loop strip.
FIG. 4 illustrates a detail of an example embodiment of the beverage container holder for vehicles showing the anchor attachment clip.

In an example embodiment, the anchors 130 can be made with foam or other compressible material, so the anchor 130 is soft enough to wedge in and then expand between the seats. The foam portions of anchor 130 can be covered with a cloth covering or other protective material. Anchors 130 can include a strap portion, which can be attached to the container holder 110 using either snaps, an anchor attachment clip 132, or other attachment mechanism as shown in FIGS. 2 and 4 and described below. Anchors 130 can also be attached to the container holder 110 with Velcro™ or other hook and loop mechanisms. In the example embodiment shown in FIG. 2, the anchors 130 can also include an anchor loop 134 attached to an end of the anchor 130. As shown and described in more detail below, the anchor loop 134 can be looped around a seat belt receptacle or other portion of the vehicle to facilitate convenient and secure retention of the container holder 110 within the vehicle. As also shown and described in more detail below, the example embodiments provide and enable various ways for positioning the container holder 110, with or without one or more attached anchors 130, within a vehicle to provide convenient and secure retention of the container holder 110 within the vehicle.

FIG. 3 illustrates a detail of an example embodiment of the beverage container holder for vehicles 100 showing the anchor attachment loop strip 112. FIG. 4 illustrates a detail of an example embodiment of the beverage container holder for vehicles 100 showing the anchor attachment clip 132. The anchor attachment clip 132 is configured to slide into and lock within a loop provided by the anchor attachment loop strips 112 attached to an outer surface of the container holder 110 as shown in FIGS. 2 and 4. The anchor attachment loop strip 112 provides a plurality of loops extending vertically from the top of the container holder 110 to the bottom. As a result, the anchor attachment clip 132 can be placed at any vertical position on the side of the container holder 110 to facilitate convenient and secure retention within the vehicle. The anchor attachment clip 132 can include a locking clip (shown in FIG. 4) to lock the anchor attachment clip 132 within a loop provided by the anchor attachment loop strips 112 as shown in FIGS. 2 and 3.

Figure 5:
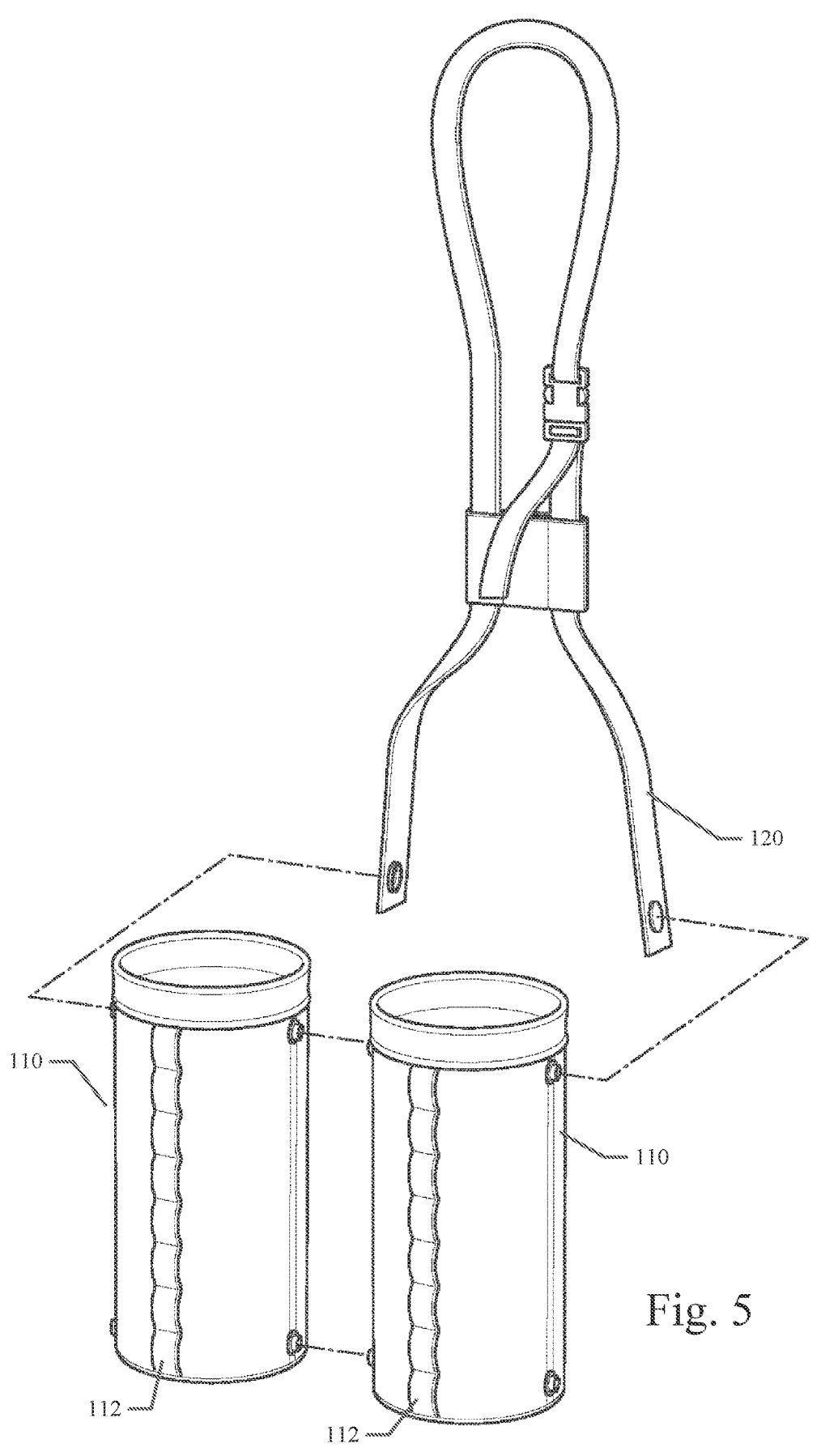
FIG. 5 illustrates an example embodiment of a double beverage container holder for vehicles with a removably attachable strap.

FIG. 5 illustrates an example embodiment of a double beverage container holder for vehicles with a removably attachable strap 120. As shown in FIG. 5, a plurality of container holders 110 can be removably attached together with snaps or clips provided on an outer surface of each container holder 110 at the top and bottom. Additionally, as shown in FIG. 5, a removably attachable strap 120 can be attached to one container holder 110 or to the plurality of container holders 110. In this manner, the one or more container holders 110 can be removably attached to strap 120, which can be used to secure the one or more container holders 110 to the vehicle as described in more detail below.

Figure 6:
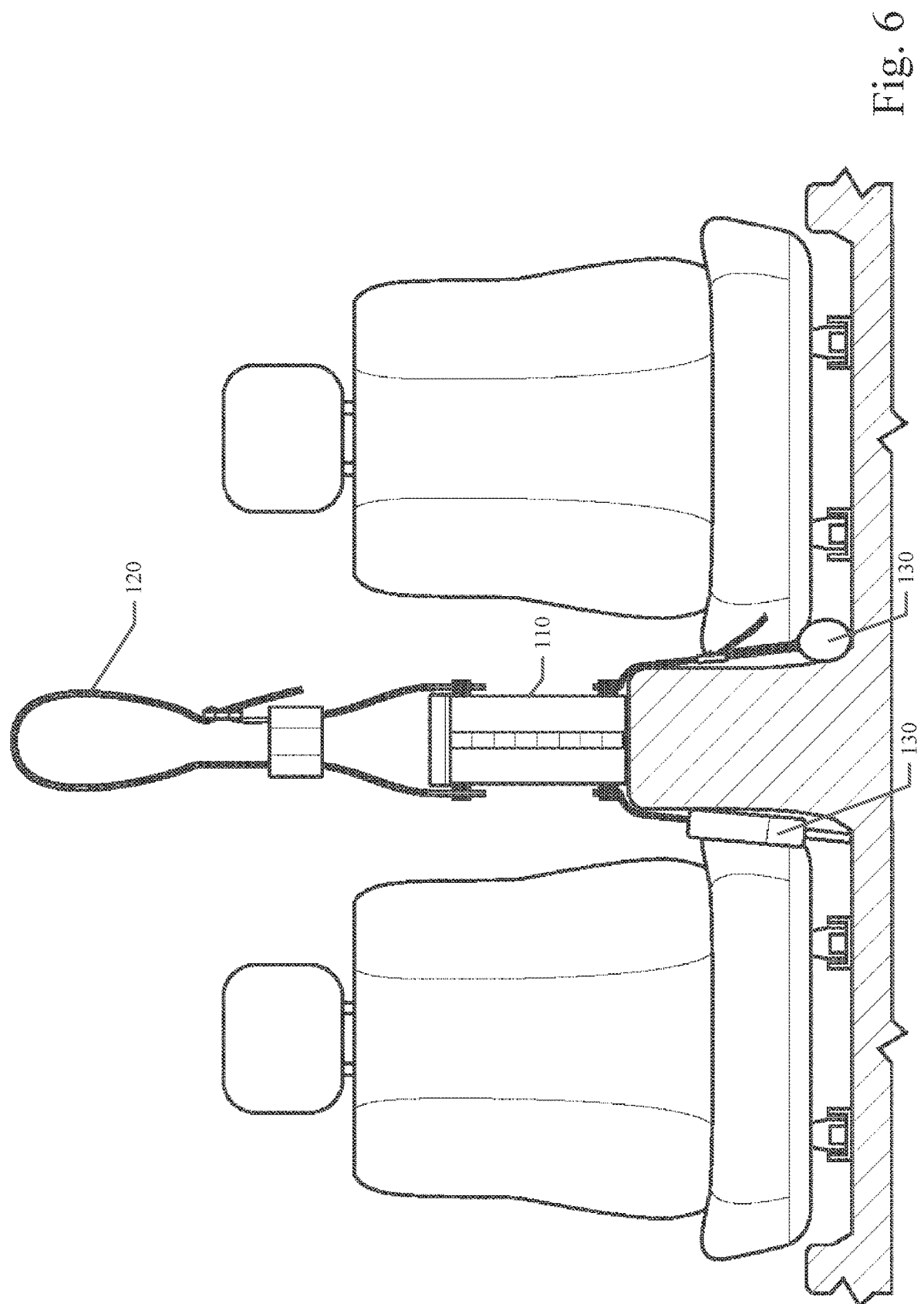
FIG. 6 illustrates an example embodiment of the beverage container holder for vehicles in use in a vehicle and secured between the seats with one or more anchors.

FIG. 6 illustrates an example embodiment of the beverage container holder for vehicles 100 in use in a vehicle and secured between the seats with one or more anchors 130. As shown in FIG. 6, the anchors 130 can be attached to the container holder 110 as described above. The anchors 130 can be wedged between the seat cushions and floorboard or center console of the vehicle. Because of the compressible foam within the anchors 130, the anchors 130 apply a force to the seat cushions and floorboard or center console, which serves to hold the anchors 130 in place within the vehicle. The container holder 110, attached to the anchors 130, is also held in place because of the stationary anchors 130. As a result, the combination of one or more anchors 130 attached to the container holder 110 can be conveniently secured in a vehicle to prevent unwanted movement of a beverage container placed into the container holder 110.

Figure 7:
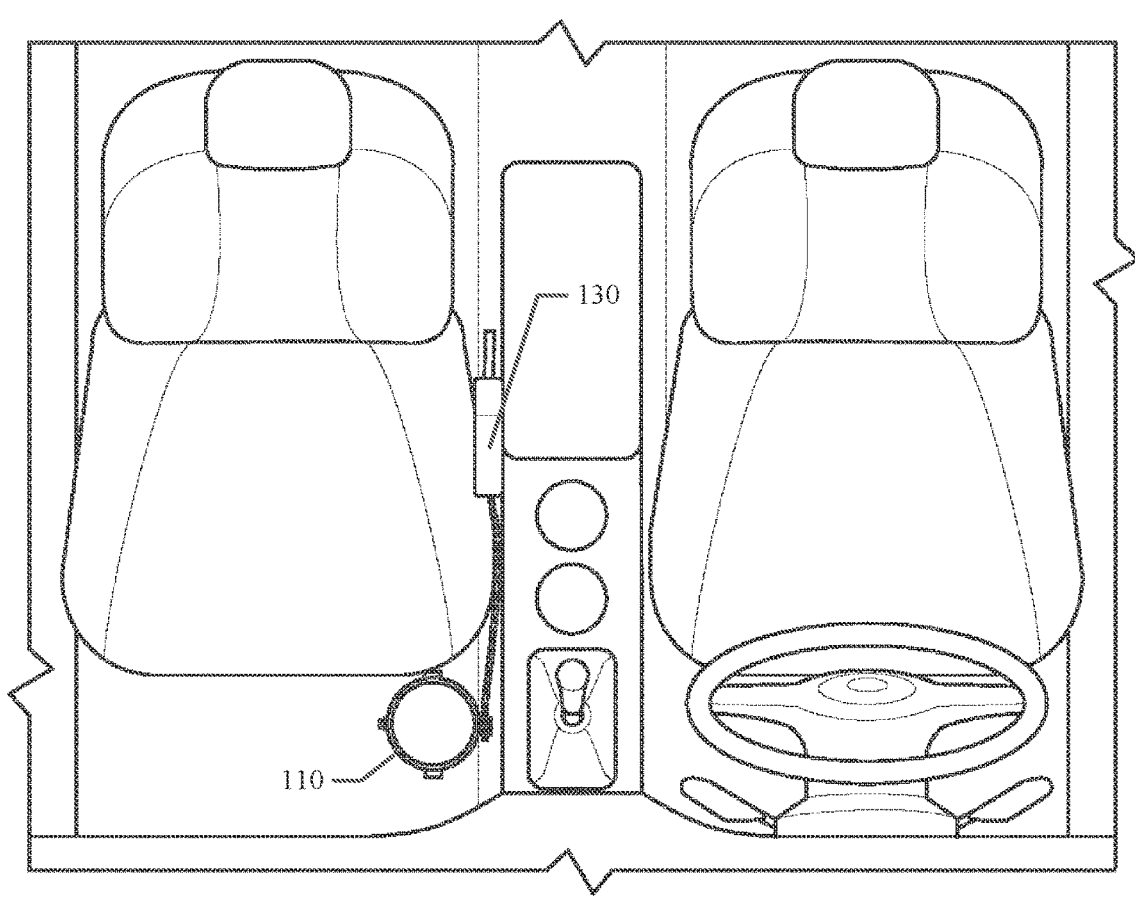
FIGS. 7-8 illustrate an example embodiment of the beverage container holder for vehicles in use in a vehicle and secured with one or more anchors on the floorboard in front of a vehicle seat.
Figure 8:
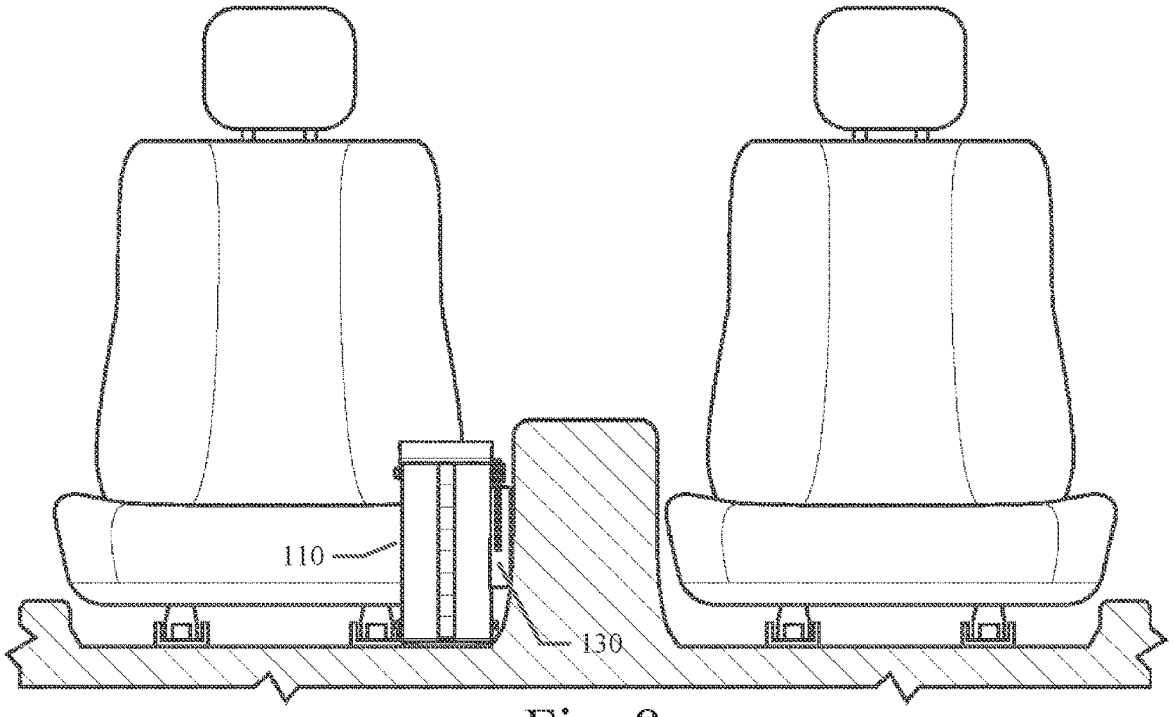

FIGS. 7-8 illustrate an example embodiment of the beverage container holder for vehicles 100 in use in a vehicle and secured with one or more anchors 130 on the floor in front of a vehicle seat. As shown in FIGS. 7-8, the anchor 130 can be attached to the container holder 110 as described above. The anchor 130 can be wedged between the seat cushion and the center console of the vehicle. Because of the compressible foam within the anchor 130, the anchor 130 applies a force to the seat cushion and the center console, which serves to hold the anchor 130 in place within the vehicle. The container holder 110, attached to the anchor 130, is also held in place on the vehicle floorboard in front of the seat because of the stationary anchor 130.

Figures 9, 10:
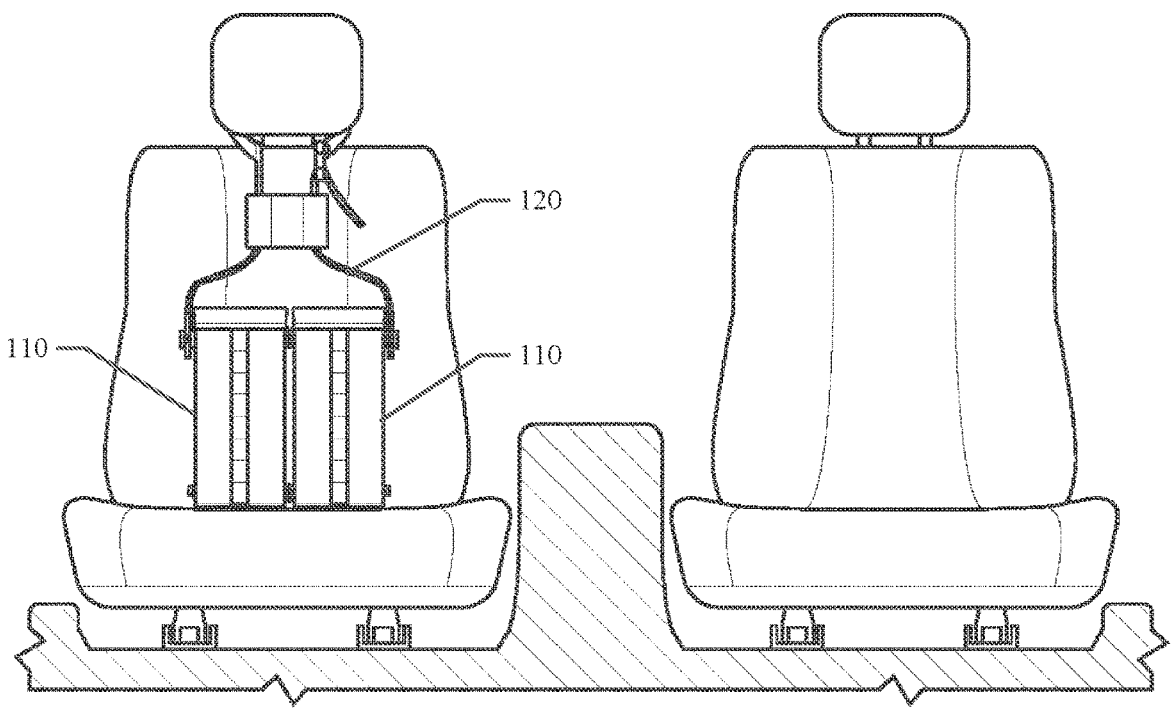
FIG. 9 illustrates an example embodiment of the beverage container holder for vehicles in use in a vehicle and secured between the seats and behind the center console with one or more anchors.
FIG. 10 illustrates an example embodiment of the beverage container holder for vehicles in use in a vehicle and secured on a seat with a removably attachable strap looped around the headrest of the seat.

FIG. 9 illustrates an example embodiment of the beverage container holder for vehicles 100 in use in a vehicle and secured between the seats and behind the center console with one or more anchors 130. As shown in FIG. 9, the anchors 130 can be attached to the container holder 110 as described above. The anchors 130 can be wedged between the seat cushions and center console of the vehicle. The container holder 110, attached to the anchors 130, can be placed behind the center console and between the seats. Because of the compressible foam within the anchors 130, the anchors 130 apply a force to the seat cushions and center console, which serves to hold the anchors 130 in place within the vehicle. The container holder 110, attached to the anchors 130, is also held in place because of the stationary anchors 130. The container holder 110, attached to the anchor 130, is held in place behind the center console and between the seats because of the stationary anchors 130. As a result, the combination of one or more anchors 130 attached to the container holder 110 can be conveniently secured in a vehicle to prevent unwanted movement of a beverage container placed into the container holder 110.

FIG. 10 illustrates an example embodiment of the beverage container holder for vehicles 100 in use in a vehicle and secured on a seat with a removably attachable strap 120 looped around the headrest of the seat. As shown in FIG. 10, the removably attachable and adjustable strap 120 can be attached to one or more container holders 110 as described above. The removably attachable strap 120 can be looped around the headrest of the vehicle seat or otherwise secured to a portion of the vehicle. Because the strap 120 can be secured to the vehicle, the attached one or more container holders 110 are also held in place because of the stationary strap 120. The one or more container holders 110, attached to the strap 120, are held in place on a seat of the vehicle because of the stationary strap 120. As a result, the combination of the strap 120 attached to the one or more container holders 110 can be conveniently secured in a vehicle to prevent unwanted movement of beverage containers placed into the one or more container holders 110.

Figure 11:
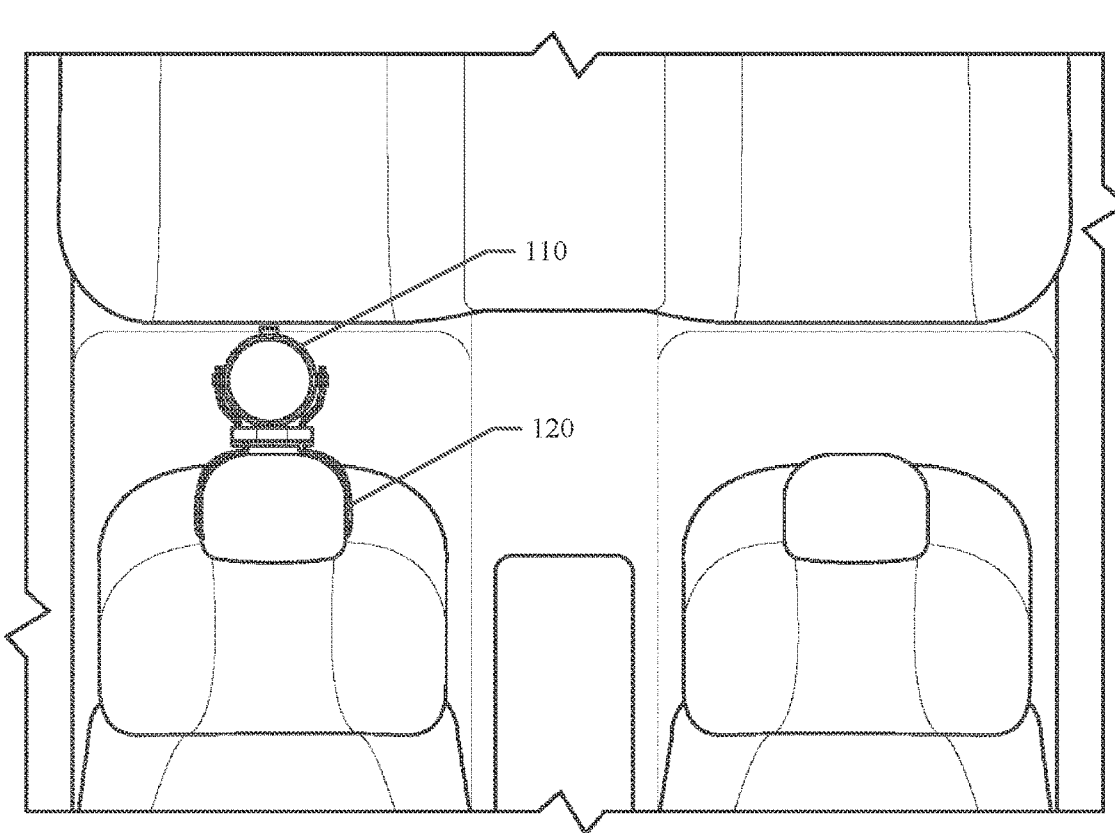
FIG. 11 illustrates an example embodiment of the beverage container holder for vehicles in use in a vehicle and secured behind a seat with a removably attachable strap looped around the headrest of the seat.

FIG. 11 illustrates an example embodiment of the beverage container holder for vehicles 100 in use in a vehicle and secured behind a seat with a removably attachable strap 120 looped around the headrest of the seat. As shown in FIG. 11, the removably attachable and adjustable strap 120 can be attached to one or more container holders 110 as described above. The removably attachable strap 120 can be looped around the headrest of the vehicle seat or otherwise secured to a portion of the vehicle. Because the strap 120 can be secured to the vehicle, the attached one or more container holders 110 are also held in place because of the stationary strap 120. The one or more container holders 110, attached to the strap 120, are held in place behind a seat of the vehicle because of the stationary strap 120. As a result, the combination of the strap 120 attached to the one or more container holders 110 can be conveniently secured in a vehicle to prevent unwanted movement of beverage containers placed into the one or more container holders 110.

Figure 12:
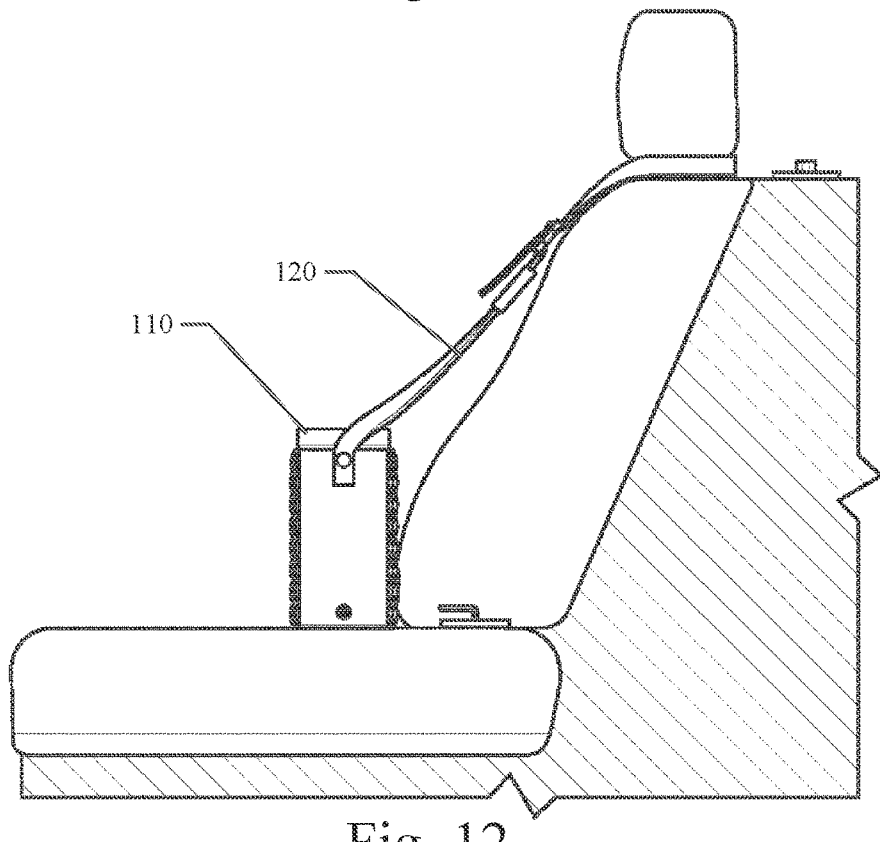
FIG. 12 illustrates an example embodiment of the beverage container holder for vehicles in use in a vehicle and secured on a seat with a removably attachable strap looped around the headrest of the seat.

FIG. 12 illustrates an example embodiment of the beverage container holder for vehicles 100 in use in a vehicle and secured on a seat with a removably attachable strap 120 looped around the headrest of the seat. As shown in FIG. 12, the removably attachable and adjustable strap 120 can be attached to one or more container holders 110 as described above. The removably attachable strap 120 can be looped around the headrest of the vehicle seat or otherwise secured to a portion of the vehicle. Because the strap 120 can be secured to the vehicle, the attached one or more container holders 110 are also held in place because of the stationary strap 120. The one or more container holders 110, attached to the strap 120, are held in place on a seat of the vehicle because of the stationary strap 120. As a result, the combination of the strap 120 attached to the one or more container holders 110 can be conveniently secured in a vehicle to prevent unwanted movement of beverage containers placed into the one or more container holders 110.

Figure 13:
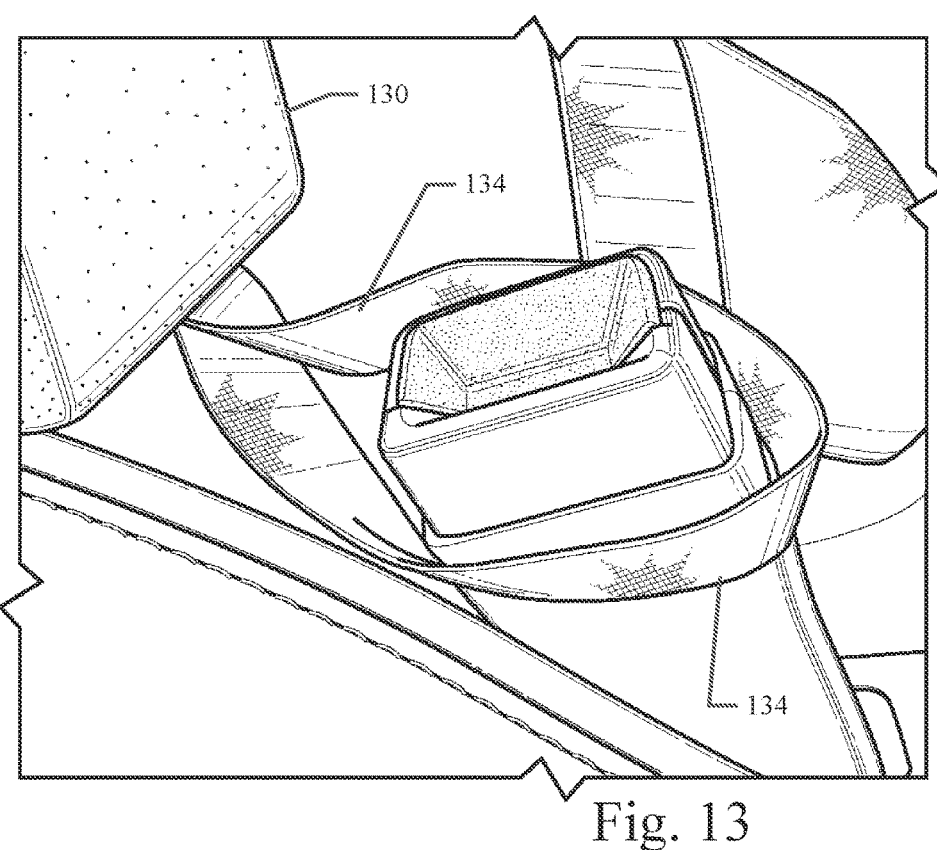
FIG. 13 illustrates an example embodiment of the beverage container holder for vehicles in use in a vehicle and secured on or adjacent to a seat with an anchor loop looped around a seat belt receptacle.

FIG. 13 illustrates an example embodiment of the beverage container holder for vehicles 100 in use in a vehicle and secured on or adjacent to a seat with an anchor loop 134 looped around a seat belt receptacle. FIG. 13 illustrates an example embodiment of the beverage container holder for vehicles 100 in use in a vehicle and secured adjacent to a vehicle seat with one or more anchors 130 having an attached anchor loop 134. As described above, the anchors 130 can be attached to the container holder 110. As shown in FIG. 13, the anchor loop 134, attached to the one or more anchors 130 can be looped around a seat belt receptacle or other portion of the vehicle. The anchor loop 134 serves to hold the anchors 130 in place within the vehicle. The container holder 110, attached to the anchors 130, is also held in place because of the stationary anchors 130. As a result, the combination of one or more anchors 130 with anchor loops 134, the one or more anchors 130 being attached to the container holder 110 can be conveniently secured in a vehicle to prevent unwanted movement of a beverage container placed into the container holder 110.

Figure 14:
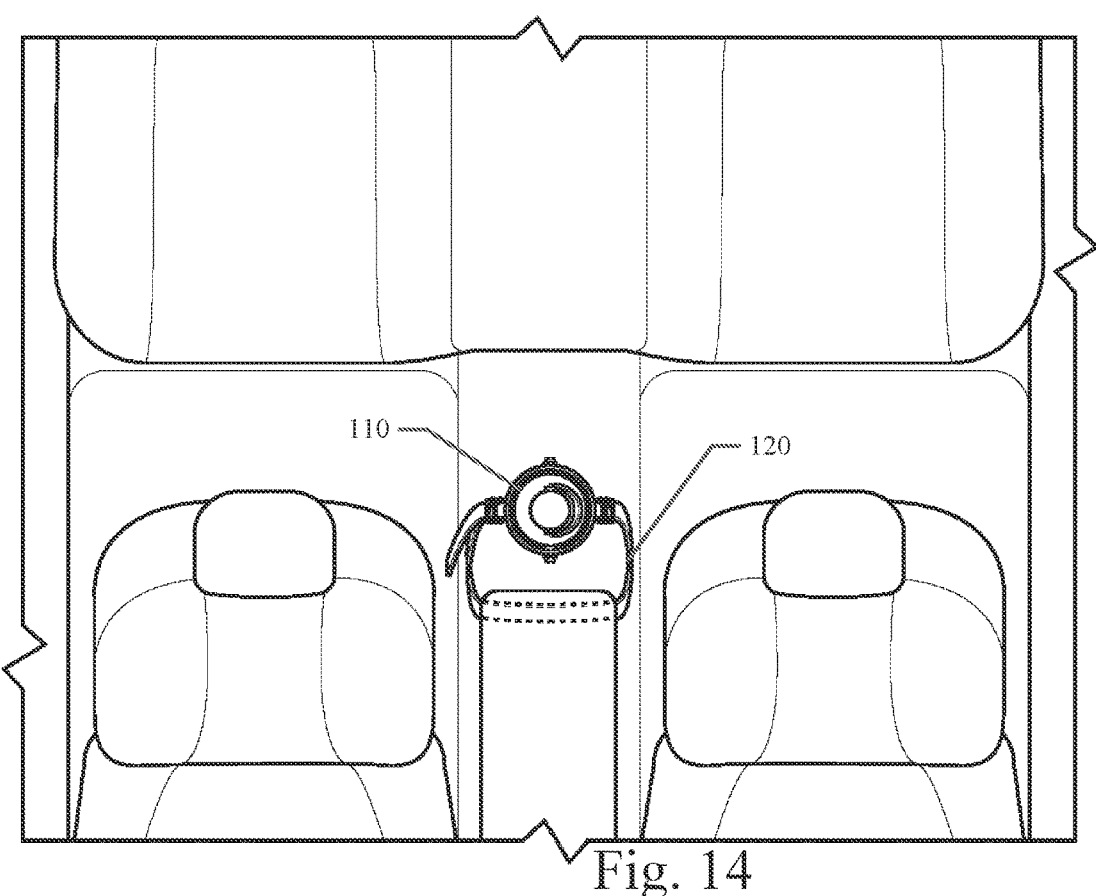
FIG. 14 illustrates an example embodiment of the beverage container holder for vehicles in use in a vehicle and secured between the seats and behind the center console with a removably attachable strap looped through a top cover of the center console.

FIG. 14 illustrates an example embodiment of the beverage container holder for vehicles 100 in use in a vehicle and secured between the seats and behind the center console with a removably attachable strap 120 looped through a top cover of the center console. As shown in FIG. 14, the removably attachable and adjustable strap 120 can be attached to one or more container holders 110 as described above. The removably attachable strap 120 can be looped through a top cover of the center console or otherwise secured to a portion of the vehicle. Because the strap 120 can be secured to the vehicle, the attached one or more container holders 110 are also held in place because of the stationary strap 120. The one or more container holders 110, attached to the strap 120, are held in place between the seats and behind a center console of the vehicle because of the stationary strap 120. As a result, the combination of the strap 120 attached to the one or more container holders 110 can be conveniently secured in a vehicle to prevent unwanted movement of beverage containers placed into the one or more container holders 110.

Figure 15:
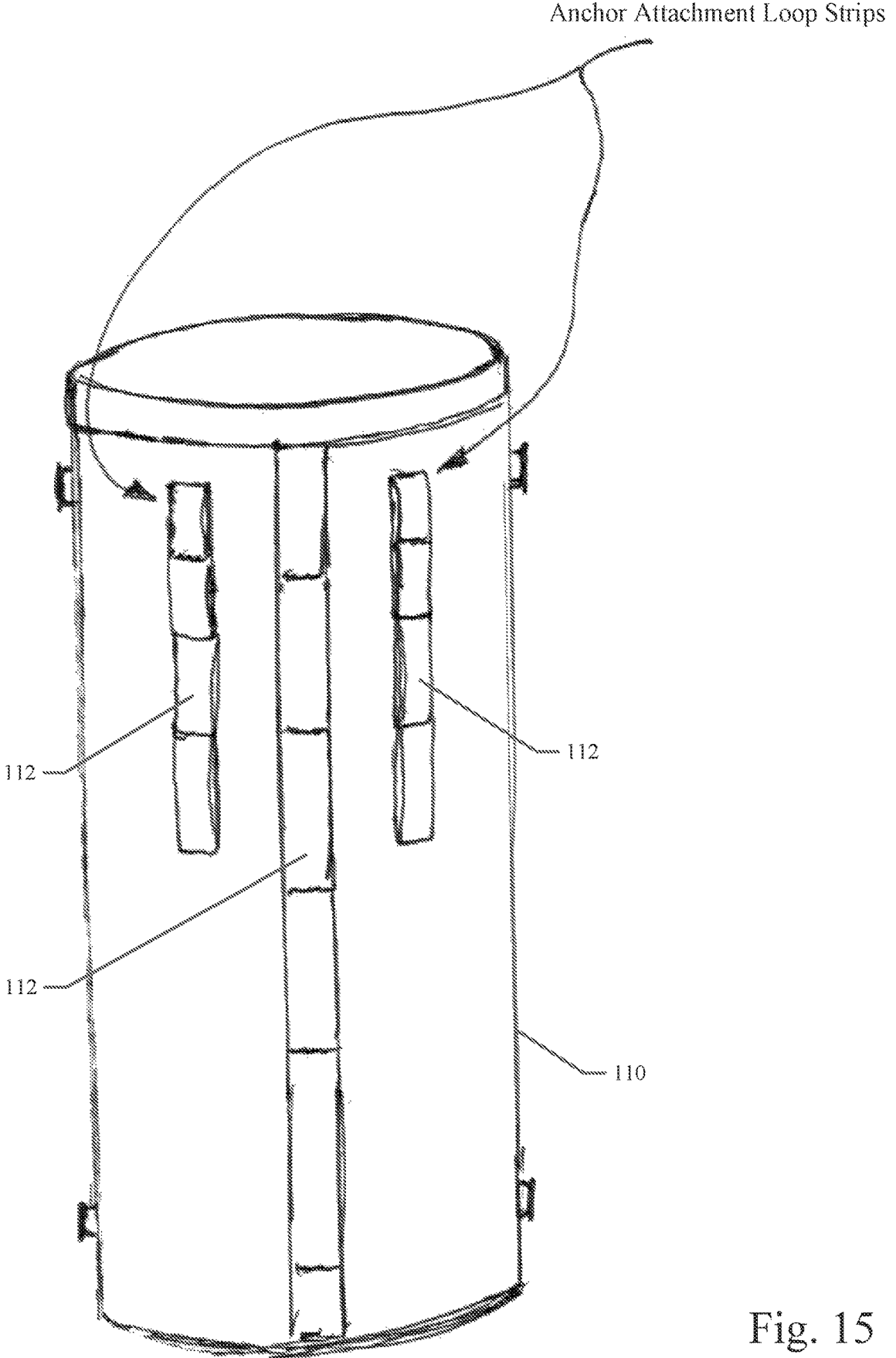
FIG. 15 illustrates an example embodiment of the beverage container holder for vehicles with multiple anchor attachment loop strips.

FIG. 15 illustrates an example embodiment of the beverage container holder for vehicles 100 with multiple anchor attachment loop strips 112. As shown in FIG. 15, multiple anchor attachment loop strips 112 can be provided down the front, back, and/or sides of the beverage container holder 110. The variable placement of the multiple anchor attachment loop strips 112 enables a variety of placement options for the beverage container holder 110 within a vehicle. In particular, the multiple anchor attachment loop strips 112 enable the removably attachable anchors 130 to be attached to the beverage container holder 110 at various locations to conform the beverage container holder 110 and removably attachable anchors 130 to a particular vehicle design configuration for a tight and secure fit within the vehicle. The multiple anchor attachment loop strips 112 also enable a plurality of removably attachable anchors 130 to be attached to the beverage container holder 110 at various locations.

FIG. 16 illustrates a flow diagram representing a sequence of operations performed in a method according to an example embodiment. In an example embodiment, the method can include: fabricating a container holder as a hollow vessel with one open end and one closed end (operation block 1010); applying an attachment mechanism to an outside surface of the container holder (operation block 1020); and fabricating an anchor configured to attach to the attachment mechanism on the container holder, the anchor including a compressible material portion (operation block 1030). The method can further include fabricating a removably attachable strap configured to attach to the container holder (operation block 1040).

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a beverage container holder for vehicles is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A beverage container holder for vehicles comprising:
a container holder configured as a hollow cylindrical vessel with one open end and one closed end;
one or more anchors removably attached to the container holder, the one or more anchors configured as a securing mechanism to confine the container holder, and a beverage container therein, to a particular desired position within a vehicle, the one or more anchors being a compressible elastomeric material covered with a protective material covering, the one or more anchors including a strap and an anchor attachment clip for removable attachment to the container holder;
wherein the container holder includes an anchor attachment loop strip;
wherein the loop strip includes a plurality of loops spaced differing distances from the open end of the hollow cylindrical vessel;
wherein at least one of the one or more anchors includes an anchor loop attached to an end of the at least one anchor; and
wherein the anchor loop is located on a side of the anchor spaced from the strap.

2. The beverage container holder for vehicles of claim 1 wherein the one or more anchors include a compressible foam material portion.

3. The beverage container holder for vehicles of claim 1 being further configured with a removably attachable strap.

4. The beverage container holder for vehicles of claim 1 being further configured with a removably attachable strap attached with snaps.

5. The beverage container holder for vehicles of claim 1 wherein the anchor attachment clip is a slide and lock type of clip.

6. The beverage container holder for vehicles of claim 1 including a second container holder removably attachable to the container holder.

7. The beverage container holder for vehicles of claim 1 wherein the one or more anchors are configured to wedge between a seat cushion and floorboard or center console of a vehicle.

8. The beverage container holder for vehicles of claim 1 being further configured with a removably attachable strap configured to loop around a headrest of a seat of a vehicle.

9. The beverage container holder for vehicles of claim 1 wherein the container holder includes a plurality of anchor attachment loop strips.

10. A beverage container holder for vehicles comprising:

a container holder configured as a hollow cylindrical vessel with one open end and one closed end;

one or more anchors removably attached to the container holder, the one or more anchors configured as a securing mechanism to confine the container holder, and a beverage container therein, to a particular desired position within a vehicle, the one or more anchors being a compressible elastomeric material covered with a protective material covering, the one or more anchors including a strap and an anchor attachment clip for removable attachment to the container holder;

wherein at least one of the one or more anchors includes an anchor loop attached to an end of the at least one anchor;

wherein the anchor loop is located on a side of the anchor spaced from the strap.

11. The beverage container holder for vehicles of claim 10 wherein the anchor loop is located on a side of the anchor opposite the strap.

12. The beverage container holder for vehicles of claim 11 wherein the anchor loop is sized large enough to fit around a seat belt receptacle between a seat of the vehicle and a console laterally adjacent to the seat of the vehicle.

13. The beverage container holder for vehicles of claim 1 wherein said container holder includes a plurality of anchor attachment loop strips spaced laterally from each other on an exterior of the hollow cylindrical vessel, and between the open end and the closed end.

14. The beverage container holder for vehicles of claim 1 wherein a sidewall of the hollow cylindrical vessel is formed of flexible material to conform to a shape of seat and console of the vehicle.

15. The beverage container holder for vehicles of claim 1 wherein the strap included with the one or more anchors is adjustable in length between the one or more anchors and the anchor attachment clip.

16. The beverage container holder for vehicles of claim 1 wherein the hollow cylindrical vessel is at least twice as tall as it is wide.

17. A beverage container holder for vehicles consisting of:

a hollow cylindrical vessel having a circular cross-section and with one open end and one closed end;

an anchor of compressible material configured to wedge into and then expand within a space between a seat and console of the vehicle;

a strap joining said anchor to said hollow cylindrical vessel;

wherein at least one of the one or more anchors includes an anchor loop attached to an end of the at least one anchor; and wherein the anchor loop is located on a side of the anchor spaced from the strap.

\* \* \* \* \*